United States Patent
Hagiwara et al.

(10) Patent No.: US 9,505,622 B2
(45) Date of Patent: Nov. 29, 2016

(54) CARBON NANOFIBERS ENCAPSULATING METAL COBALT, AND PRODUCTION METHOD THEREFOR

(71) Applicant: MITSUBISHI MATERIALS CORPORATION, Tokyo (JP)

(72) Inventors: Masahiro Hagiwara, Akita (JP); Hiroyuki Imai, Saitama (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 51 days.

(21) Appl. No.: 14/342,881

(22) PCT Filed: Sep. 28, 2012

(86) PCT No.: PCT/JP2012/075148
§ 371 (c)(1),
(2) Date: Mar. 5, 2014

(87) PCT Pub. No.: WO2013/047782
PCT Pub. Date: Apr. 4, 2013

(65) Prior Publication Data
US 2014/0241974 A1     Aug. 28, 2014

(30) Foreign Application Priority Data

Sep. 30, 2011  (JP) .................................. 2011-217909

(51) Int. Cl.
*C01B 31/02*     (2006.01)
*D01F 9/127*     (2006.01)
(Continued)

(52) U.S. Cl.
CPC ............ *C01B 31/0293* (2013.01); *B82Y 30/00* (2013.01); *B82Y 40/00* (2013.01); *C01B 31/0233* (2013.01); *D01F 9/127* (2013.01); *Y10S 977/734* (2013.01); *Y10S 977/843* (2013.01)

(58) Field of Classification Search
CPC ............ C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ........ 423/447.1–447.3, 445 B; 977/742–754, 977/842–848
See application file for complete search history.

(56) References Cited

U.S. PATENT DOCUMENTS

| | | | |
|---|---|---|---|
| 4,650,657 A | 3/1987 | Brooks | |
| 5,171,560 A | 12/1992 | Tennent | |

(Continued)

FOREIGN PATENT DOCUMENTS

| | | |
|---|---|---|
| CN | 1170631 A | 1/1998 |
| CN | 1803280 A | 7/2006 |

(Continued)

OTHER PUBLICATIONS

R K.Rana et al., "Preparation, Texture, and Magnetic Properties of Carbon Nanotubes/Nanoparticles Doped with Cobalt", J. Phys Chem.B 2002, vol. 106, Mar. 30, 2002, pp. 4079-4084.

(Continued)

*Primary Examiner* — Daniel C McCracken
(74) *Attorney, Agent, or Firm* — Locke Lord LLP; James E. Armstrong, IV; Nicholas J. DiCeglie, Jr.

(57) ABSTRACT

This carbon nanofiber is produced by a vapor phase reaction of a carbon oxide-containing raw material gas using a metal oxide powder including a Co oxide as a catalyst, wherein at least one type selected from metal cobalt, carbon-containing cobalt metals, and cobalt-carbon compounds is contained (encapsulated) in the fiber in a wrapped state. This method for producing a carbon nanofiber includes: producing a carbon nanofiber by a vapor phase reaction of a carbon oxide-containing raw material gas using a mixed powder of a Co oxide and a Mg oxide as a catalyst, wherein a mixed powder of CoO and MgO, which is obtained by hydrogen-reducing a mixed powder of $Co_3O_4$ and MgO using a reduction gas having a hydrogen concentration in which metal cobalt is not generated, is used as the catalyst.

2 Claims, 4 Drawing Sheets

(51) Int. Cl.
B82Y 30/00 (2011.01)
B82Y 40/00 (2011.01)

(56) References Cited

U.S. PATENT DOCUMENTS

| | | | | |
|---|---|---|---|---|
| 5,965,267 | A | * | 10/1999 | Nolan et al. ............ 428/408 |
| 2003/0108479 | A1 | | 6/2003 | Baker et al. |
| 2006/0122056 | A1 | | 6/2006 | Pradhan et al. |

FOREIGN PATENT DOCUMENTS

| | | | |
|---|---|---|---|
| CN | 101119798 A | 2/2008 | |
| CN | 101381080 A | 3/2009 | |
| CN | 101665249 A | 3/2010 | |
| CN | 101912792 A | 12/2010 | |
| CN | 102449825 A | 5/2012 | |
| CN | 102575101 A | 7/2012 | |
| CN | 102597109 A | 7/2012 | |
| CN | 103181004 A | 6/2013 | |
| JP | 2002-115059 A | 4/2002 | |
| JP | 2003-206117 A | 7/2003 | |
| JP | 2004-299986 A | 10/2004 | |
| JP | 2005-097708 A | 4/2005 | |
| JP | 2005-239481 A | 9/2005 | |
| JP | 2006-152490 A | 6/2006 | |
| JP | 4565384 B2 | 10/2010 | |
| JP | 2011-168429 A | 9/2011 | |

OTHER PUBLICATIONS

Office Action mailed Feb. 13, 2015, issued for the Korean patent application No. 10-2014-7002919 and English translation thereof.
International Search Report dated Dec. 4, 2012, issued for PCT/JP2012/075148.
Office Action dated Dec. 11, 2014, issued for the Chinese patent application No. 201280039976.9.
Yasushi Soneda et al., "Synthesis of high quality multi-walled carbon nanotubes from the decomposition of acetylene on iron-group metal catalysts supported on MgO", Carbon, vol. 40, No. 6, 1 May 1, 2002, pp. 965-969.
B. K. Singh et al., "Growth of multiwalled carbon nanotubes from acetylene over in situ formed Co nanoparticles on MgO support", Solid State Communications, vol. 139, No. 3, Jun. 8, 2006, pp. 102-107.
E. Flahaut et al., "CCVD Synthesis and Characterization of Cobalt-Encapsulated Nanoparticles", Chemistry of Materials, American Chemical Society, vol. 14, No. 6, Apr. 23, 2002, pp. 2553-2558.
Supplementary European Search Report dated Apr. 10, 2015, issued for the European patent application No. 12835127.7.

* cited by examiner

US 9,505,622 B2

CARBON NANOFIBERS ENCAPSULATING METAL COBALT, AND PRODUCTION METHOD THEREFOR

TECHNICAL FIELD

The present invention relates to a carbon nanofiber which is less affected by a residual catalyst and a production method therefor.

The present application claims priority on Japanese Patent Application No. 2011-2.17909 filed on Sep. 30, 2011, the content of which is incorporated herein by reference.

BACKGROUND ART

Since carbon nanofiber are nano-level fine carbon fibers and have excellent conductivity, the carbon nanofiber have been widely used as a conductive material and &so widely used as a functional material based on mechanical properties or the like.

Carbon nanotubes can be produced by an electrode discharge method, a vapor phase growth method, a laser method and the like. Among them, in the vapor phase growth method, for example, oxides of iron, nickel, cobalt, magnesium and the like are used as a catalyst, and a mixed gas of either one of carbon monoxide or carbon dioxide and hydrogen is used as a raw material gas. Then, the raw material gas is subjected to thermal decomposition at a high temperature to generate carbon, and the generated carbon is grown in a fiber shape using a catalyst particle as a nucleus (Patent Documents 1 and 2).

In a production method by vapor phase growth in which a catalyst is used, when a raw material gas is subjected to a vapor phase reaction (thermal decomposition), a metal oxide as a catalyst component is reduced by hydrogen in the raw material gas to generate metal, a carbon-containing metal, or a metal-carbon compound. This product adheres to and remains on the carbon nanofibers in some cases. The physical properties of the fiber may be damaged depending on the type of metal remaining on the surface of the fiber.

For example, in a production method by vapor phase growth in the related art, it has been known that a mixed powder of CoO and MgO, or a mixed powder of $Co_3O_4$ and MgO is used as a catalyst. When a raw material gas is subjected to thermal decomposition, at least one type of metal-based Co selected from metal cobalt, carbon-containing cobalt metals, and cobalt-carbon compounds is generated. If the metal-based Co remains on the surfaces of fibers in an unstable state, in the case where carbon nanofibers are used as a conductive filler in a resin composition, or as a conductive assistant in a lithium secondary battery of the like, electric properties such as conductivity, strength, lifespan and the like are affected by the metal-based Co.

In the related art, generally, carbon nanofibers produced by vapor phase growth in which a catalyst is used are immersed in hydrochloric acid nitric acid, hydrofluoric acid, or the like so as to remove a residual catalyst. In addition, it has been known that the carbon nanofiber are used in a state where catalyst particles are included in the carbon nanofibers as they are and the catalyst particles are supported by the carbon nanofibers (Patent Document 1). However, the metal-based Co which is included in the carbon nanofibers and is supported by the carbon nanofibers is not necessarily stable. Thus, if the metal-based Co is detached or exfoliated from the fibers, electric properties, strength, durability or the like of a product using the carbon nanofibers are affected.

PRIOR ART DOCUMENT

Patent Documents

Patent Document Japanese Patent No. 4565384
Patent Document Japanese Unexamined Patent Application, First Publication No. 2003-206117

DISCLOSURE OF THE INVENTION

Problems to be Solved by the Invention

The present invention is to solve the above-described problem in the vapor phase growth method with respect to the method for producing a carbon nanofiber, and to provide a carbon nanofiber which is stabilized by enclosing metal-based Co in the fiber so that the metal-based Co generated by reduction of a Co oxide does not remain on the surface of the fiber in an unstable state in a production method in which a Co oxide-containing catalyst is used, and a production method therefor.

Means for Solving the Problems

The present invention relates to a carbon nanofiber having the following configuration.

[1] A carbon nanofiber that is produced by a vapor phase reaction of a carbon oxide-containing raw material gas using a metal oxide powder containing a Co oxide as a catalyst, wherein at least one type selected from metal cobalt, carbon-containing cobalt metals, and cobalt-carbon compounds is contained (encapsulated) in the fiber in a wrapped state.

[2] The carbon nanofiber according to [1], wherein at least one type which is selected from the metal cobalt, the carbon-containing cobalt metals, and the cobalt-carbon compounds and which has a granular shape is encapsulated at a tip end of the fiber.

[3] The carbon nanofiber according to [1] or [2], wherein at least one type which is selected from the metal cobalt, the carbon-containing cobalt metals, and the cobalt-carbon compounds and which has a granular shape and a size to occupy 10% to 90% of an inner diameter of the fiber is encapsulated.

In addition, the present invention relates to a method for producing a carbon nanofiber having the following configuration.

[4] A method for producing a carbon nanofiber including: producing a carbon nanofiber by a vapor phase reaction of a carbon oxide-containing raw material gas using a mixed powder of a Co oxide and a Mg oxide as a catalyst, wherein a mixed powder of Coo and MgO, which is obtained by subjecting a mixed powder of $Co_3O_4$ and MgO to hydrogen reduction using as reduction gas having a hydrogen concentration in which metal cobalt is not generated, is used as the catalyst to produce the carbon nanofiber in which at least one type selected from metal cobalt, carbon-containing cobalt metals, and cobalt-carbon compounds is encapsulated in the fiber.

[5] The method for producing a carbon nanofiber according to [4], wherein the mixed powder of $Co_3O_4$ and MgO is subjected to hydrogen reduction using a reduction gas having a hydrogen concentration of 1 vol % to 10 vol %.

[6] The method for producing a carbon nanofiber according to [4] or [5], further including: subjecting the mixed powder of $Co_3O_4$ and MgO to hydrogen reduction, wherein a hydrogen reduction temperature is set to be within a vapor phase reaction temperature range of the raw material gas, and subsequent to the hydrogen reduction, the reduction gas is changed to the raw material gas, and thereby, activation of the catalyst by the hydrogen reduction and a vapor phase reaction of the raw material gas are continuously performed.

Effects of the Invention

In the carbon nanofibers according to the aspects [1] to [3] of the present invention, the metal-based Co generated by the reduction of the Co oxide as a catalyst component is contained in the fiber in a wrapped state. Since the metal-based Co is in an enclosed state, the metal-based Co is stabilized and not likely to be detached or exfoliated. Accordingly, the conductivity and the chemical properties of the fiber are not affected by the metal-based Co.

In the carbon nanofiber according to the aspect [2] of the present invention, the metal-based Co is contained at the tip end of the fiber or the like while maintaining a fiber shape. Therefore, the mechanical properties of the fiber and the like are also not affected by the metal-based Co.

EMBODIMENTS OF THE INVENTION

Hereinafter, a detailed description of the present invention will be given based on an embodiment.

[CNF in which Metal-Based Co is Encapsulated]

A carbon nanofiber (CNF) of the present embodiment is produced by a vapor phase reaction of a carbon oxide-containing raw material gas using a metal oxide powder containing a Co oxide as a catalyst, and metal-based Co is contained (encapsulated) in the fiber in a wrapped state.

Here, the metal-based Co is at least one type selected from metal cobalt, carbon-containing cobalt metals, and cobalt-carbon compounds.

As the catalyst containing the Co oxide, for example, there may be a mixed powder of CoO and MgO. In a step of producing a carbon nanofiber in which the mixed powder is used as the catalyst, carbon which is generated by thermal deposition of the raw material gas (mixed gas of a carbon oxide and hydrogen) is grown in a fiber shape using a catalyst particle as a nucleus. Thus, the carbon nanofiber is formed.

On the other hand, during the vapor phase growth of the carbon nanofiber, CoO which is a catalyst component is reduced by hydrogen in the raw material gas to generate metal-taped Co. The metal-based Co is incorporated into the carbon nanofiber. If the metal-based Co incorporated into the carbon nanofiber becomes unstable while not being sufficiently encapsulated in the fiber, the metal-based Co is detached or exfoliated and thus, the physical properties of the carbon nanofiber are affected by the metal-based Co.

In order to prevent such a problem, in the carbon nano-fiber of the present embodiment, the metal-based Co generated by reducing CoO which is the catalyst component is stably contained therein.

Figure 1:
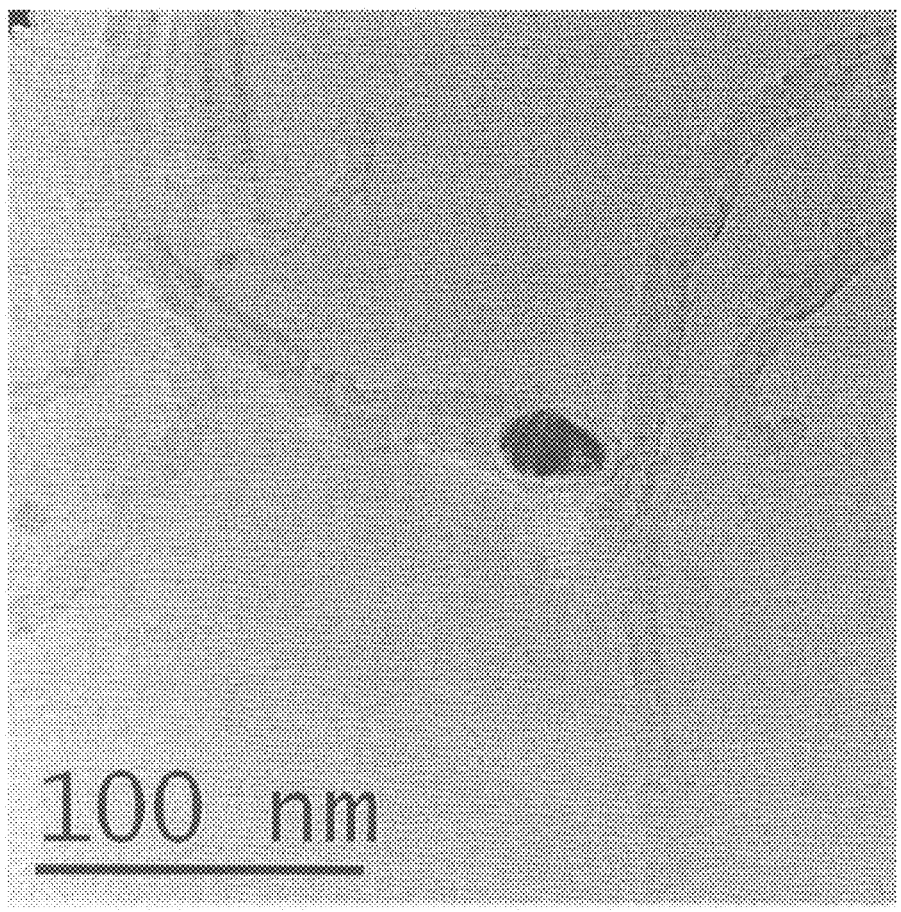
FIG. 1 is a cross-sectional photomicrograph of a carbon nanofiber (CNF) according to an embodiment.
Figure 2:
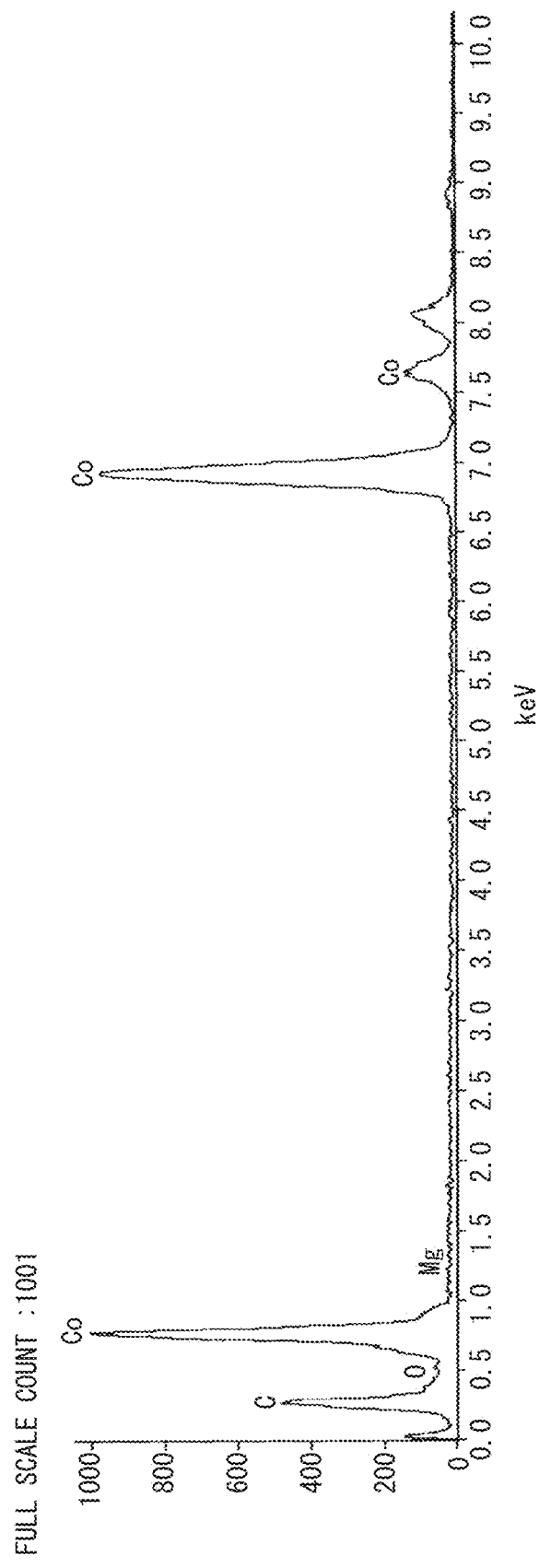
FIG. 2 is an elemental analysis chart of a part of the CNF shown in FIG. 1 in which a granular substance is encapsulated.
Figure 3:
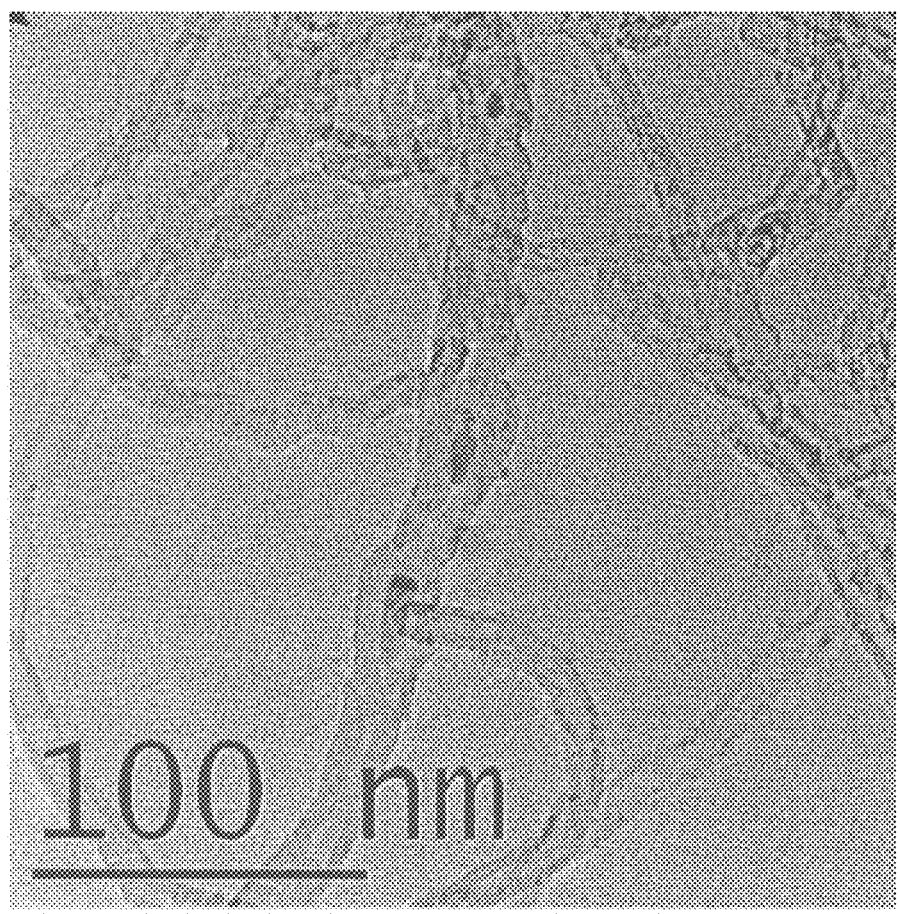
FIG. 3 is a cross-sectional photomicrograph of another carbon nanofiber (CNF) according to the embodiment.

Cross-sectional photomicrographs of the carbon nanofiber of the present embodiment are shown in FIGS. 1 to 4. As shown in FIG. 1, a granular substance (metal-based Co which will be described later) is contained (encapsulated) inside a tip end of the fiber in a wrapped state, and the granular substance (metal-based Co) is not exposed to the surface. Further, as shown in FIG. 3, a granular substance (metal-based, Co) is contained (encapsulated) in the middle of the longitudinal direction of the fiber in a wrapped state, and the granular substance (metal-based Co) is not exposed to the surface.

At the tip end of the carbon nanofiber shown in FIG. 1, a part in which the granular substance is encapsulated was subjected to elemental analysis. As a result, as shown in a chart of FIG. 2, a high peak of Co is observed; and therefore, it is found that the granular substance is metal-based Co. In the same manner, a part of the carbon nanofiber of FIG. 3 in which the granular substance is encapsulated was subjected to elemental analysis. As a result, as shown in a chart of FIG. 4, a high peak of Co is observed; and therefore, it is found that the granular substance is metal-based Co.

As a catalyst powder (particle), a powder having a particle diameter corresponding to the fiber diameter (thickness) of the carbon nanofiber is used, and a powder having a diameter of substantially several nm is used. The carbon nanofiber is grown using the catalyst particle as a nucleus and the metal-based Co generated by reducing CoO is contained in a granular state having a size to occupy 10% to 100% of the inner diameter of the fiber according to the growth of the fiber as shown in FIGS. 1 and 3. The size of the metal-based Co is preferably in a range of 70% to 100% of the inner diameter of the fiber, but is not limited to this range.

[Production Method]

In a vapor phase growth method in which a mixed powder of CoO and MgO is used as a catalyst, the carbon nanofiber in which metal-based Co is encapsulated in the fiber can be stably produced by adjusting an activated state of the catalyst due to hydrogen reduction.

Specifically, in a method for producing a carbon nanofiber by a vapor phase reaction of a carbon oxide-containing raw material gas using a mixed powder of a Co oxide and a Mg oxide as a catalyst, a mixed powder of CoO and MgO, which is obtained by subjecting a mixed powder of $Co_3O_4$ and MgO to hydrogen reduction using a reduction gas having a hydrogen concentration in which metal cobalt is not generated, is used as a catalyst. Thus, the carbon nanofiber in which metal-based Co is encapsulated in the fiber can be produced.

That is, the production method of the embodiment has the following steps:

(1) a step of preparing a mixed powder of CoO and MgO activated by subjecting a mixed powder of $Co_3O_4$ and MgO to hydrogen reduction using a reduction gas having a hydrogen concentration in which metal cobalt is not generated; and (2) a step of producing a carbon nanofiber by a vapor phase reaction of a carbon oxide-containing raw material gas using the mixed powder of CoO and MgO as a catalyst.

Regarding the mixed powder of $Co_3O_4$ and MgO, for example, a mixing ratio is preferably $Co_3O_4$:MgO=90:10 to 10:90 (weight parts), and a fine powder having an average diameter of 10 nm to 100 nm is preferable. The mixing ratio of the mixed powder is more preferably $Co_3O_4$:MgO=25:75 to 75:25, and the average diameter of the mixed powder is more preferably in a range of 5 nm to 50 nm. However, the mixing ratio and the diameter are not limited to the ranges.

The mixed powder of CoO and MgO activated by subjecting the mixed powder of $Co_3O_4$ and MgO to hydrogen reduction is used as the catalyst.

A precipitate may be formed from a solution containing Co and Mg, and the precipitate may be subjected to a thermal oxidation treatment to obtain a mixed powder of $Co_3O_4$ and MgO. In the mixed powder obtained by this production method, some of $Co_3O_4$ and MgO are included in a composite state or in a solid-solubilized state, in some cases, depending on conditions. A mixed powder in which some of CoO and MgO are included in a composite state or in a solid-solubilized state depending on conditions can be obtained by subjecting the mixed powder of $Co_3O_4$ and MgO to hydrogen reduction. A reaction in which carbon grows in a fiber shape in a vapor phase is promoted smoothly using the mixed powder of CoO and MgO as the catalyst; and thereby, a carbon nanofiber having stable physical properties can be obtained.

Instead of the mixed powder of CoO and MgO obtained by subjecting the mixed powder of $Co_3O_4$ and MgO to hydrogen reduction, a powder obtained by mixing a CoO powder and a MgO powder which are commercially available can be used as the catalyst; however, the reaction in which carbon grows in a fiber shape in a vapor phase becomes unstable and thereby, the carbon nanofiber in which metal-based Co is sufficiently encapsulated cannot be obtained.

In the hydrogen reduction of the mixed powder of $Co_3O_4$ and MgO, a mixed gas of hydrogen and an inert gas (He or the like) can be used. The hydrogen concentration in the reduction gas is preferably in a range of 0.1 vol % to 10 vol %, and more preferably in a range of 1 vol % to 10 vol %. If the hydrogen concentration is higher than 10 vol %, the $Co_3O_4$ is reduced to metal Co, which is not preferable. In addition, if the hydrogen concentration is lower than 0.1 vol %, the hydrogen reduction of the $Co_3O_4$ is not sufficient, which is not preferable.

It is preferable to set a hydrogen reduction temperature of the mixed powder of $Co_3O_4$ and MgO to be in a vapor phase reaction temperature range of the raw material gas, which will be described later. In this case, activation of the catalyst by the hydrogen reduction and a vapor phase reaction of the raw material gas can be continuously performed by changing the reduction gas to the raw material gas subsequent to the hydrogen reduction. According to the continuous production method, production efficiency can be improved remarkably.

The above-described catalyst particle (mixed powder of CoO and MgO) is placed on a substrate in a furnace, and a mixed gas of Co and $H_2$ or a mixed gas of $CO_2$ and $H_2$ is supplied to the inside of the furnace as the raw material gas to promote the vapor phase reaction (thermal decomposition reaction and reduction decomposition). For example, the pressure in the furnace is in a range of 0.08 MPa to 10 MPa, and preferably in a range of 0.09 MPa to 2 MPa. The temperature of the vapor phase reaction is in a range of 450° C. to 800° C., and preferably in a range of 550° C. to 650° C. A time for supplying the raw material gas to the inside of the furnace is in a range of 10 minutes to 10 hours, and preferably in a range of 1 hour to 2 hours. A $CO/H_2$ ratio (volume ratio) or a $CO_2/H_2$ ratio (volume ratio) in the raw material gas is suitably in a range of 20/80 to 99/1, and preferably in a range of 50/50 to 95/5.

Carbon generated by thermal decomposition and reduction decomposition of the raw material gas grows in a fiber shape using the catalyst particle as the nucleus (vapor phase growth reaction). According to the production method of the embodiment, since the vapor phase growth reaction is stably promoted, the carbon nanofiber in which metal-based Co is encapsulated in the fiber can be reliably obtained.

EXAMPLES

Hereinafter, examples of the present invention will be described with comparative examples.

Examples 1 and 2 and Comparative Examples 1 and 2

1 g of a catalyst shown in FIG. 1 was placed on an aluminum substrate. The substrate on which the catalyst was placed was arranged in a horizontal-type tubular furnace and the pressure in the furnace was set to 0.10 MPa. The raw material gas ($CO/H_2$ ratio: 90/10 to 40/60) was supplied (supply amount: 0.5 L/min to 5 L/min) to the inside of the furnace for 60 minutes to 120 minutes in a state in which the temperature in the furnace was adjusted to be in a range of 550° C. to 650° C. Thus, carbon nanofibers (CNFs) were produced. The obtained carbon nanofibers were washed with 10% concentration sulfuric acid for 10 minutes at 60° C.; and thereby, a separated catalyst such as magnesium was washed and removed.

The carbon nanofibers were immersed in nitric acid (concentration of 55 wt %) for 24 hours at 90° C. The Co concentrations of the carbon nanofiber before, and after the immersion in the nitric acid were measured by an ICP emission spectrochemical analysis method to calculate a change ratio of the content of cobalt. The results are shown in Table 2.

As shown in Table 2, metal-based Co was encapsulated at the tip ends of all of the carbon nanofibers of Examples 1 and 2, and even in the case where the carbon nanofibers were immersed in the nitric acid for a long period of time, the metal Co was not eluted.

On the other hand, metal-based Co was not contained at the tip ends of some of the CNFs in Comparative Example 1. Further, about a half of the metal-based Co that was contained at the tip ends of the CNF's was elated by the nitric acid. Therefore, the state of the metal-based Co was unstable.

In Comparative Example 2, a ratio of the CNF in which metal-based Co was contained at the tip end was small. Further, most of the metal-based Co was elated by the nitric acid. Therefore, the state of the metal-based Co was very unstable.

TABLE 1

| Type of catalyst | Properties |
| --- | --- |
| Catalyst A | Mixed powder of CoO and MgO obtained as follows: mixed powder of $Co_3O_4$ and MgO obtained by wet type production method was reduced at 600° C. using mixed gas of hydrogen and helium having hydrogen concentration of 5 vol %. |
| Catalyst B | CoO—MgO mixed powder obtained in the same manner as Catalyst A except that mixed gas of hydrogen and helium having hydrogen concentration of 80 vol % was used. |
| Catalyst C | Mixed powder of commercially available CoO powder and commercially available MgO powder |

Note:
All of the average diameters of Catalysts A, B and C were in a range of 20 nm to 50 nm.

TABLE 2

| | Example 1 | Example 2 | Comparative example 1 | Comparative example 2 |
| --- | --- | --- | --- | --- |
| Type of catalyst | A | A | B | C |
| Raw material gas ($CO/H_2$ ratio) | 80/20 | 40/60 | 80/20 | 40/60 |
| Reaction temperature (° C.) | 550 | 650 | 550 | 650 |
| Reaction time (minute) | 120 | 60 | 120 | 60 |
| Co-containing state in CNF | Metal Co was encapsulated at tip end of CNF. | Metal Co was encapsulated at tip end of CNF. | Metal Co was not contained in some of CNFs. | There were few CNFs containing metal Co. |

TABLE 2-continued

| | Example 1 | Example 2 | Comparative example 1 | Comparative example 2 |
|---|---|---|---|---|
| Co concentration change before and after nitric acid immersion | No change | No change | Reduced by 50 wt. % | Reduced by 90 wt. % |

The carbon nanofiber obtained by the production method of the present embodiment was analyzed. In the analysis, a transmission electron microscope (JEM-2010F) manufactured by JEOL Ltd. was used. In the elemental analysis, an EDS element analyzing apparatus (MORAN SYSTEM 7) manufactured by Thermo Fisher Scientific K.K. was used. A cross-sectional photomicrograph was shown in FIG. 1. As shown in the photomicrograph, a granular substance was encapsulated inside the tip end of the fiber. The encapsulated part was subjected to elemental analysis. The result was shown in FIG. 2. As shown in the chart of FIG. 2, it was found that the encapsulated part was Co in a metal state.

Figure 4:
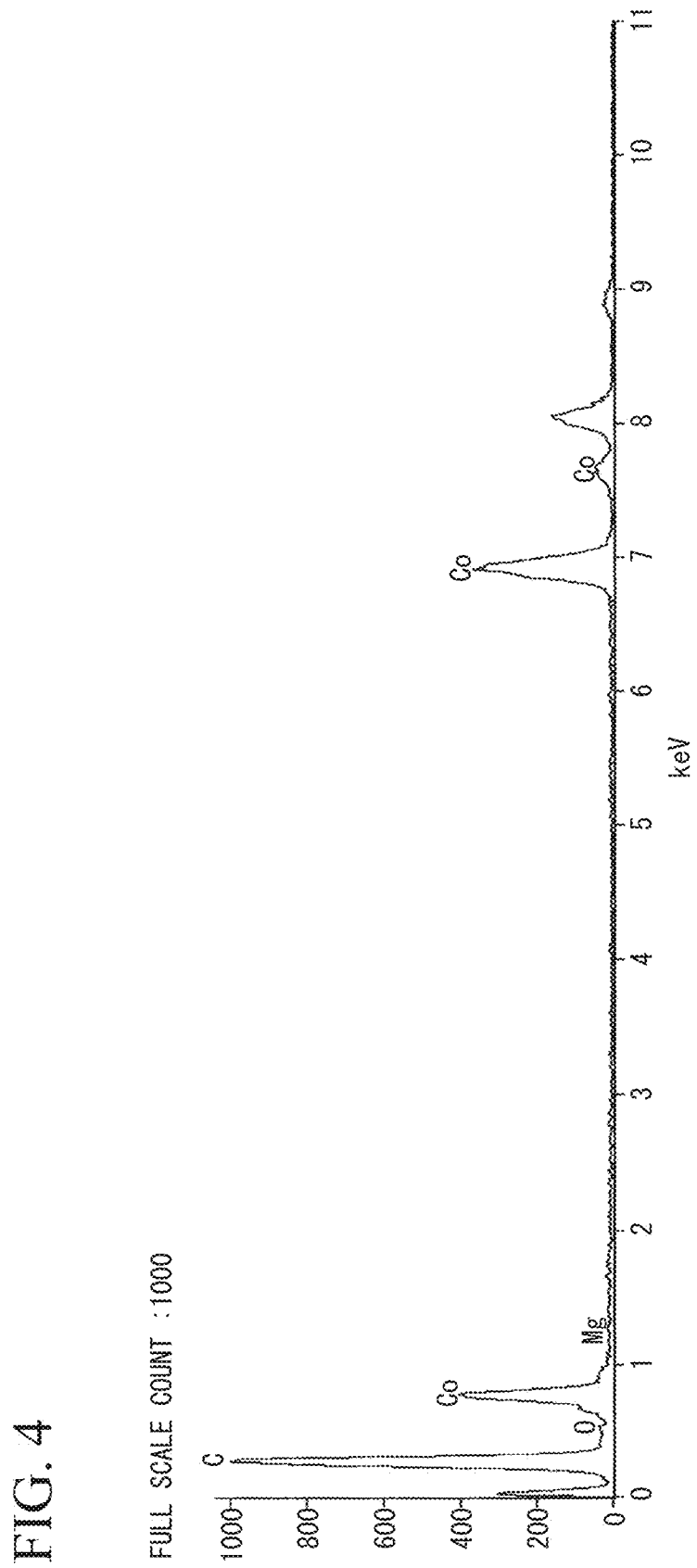
FIG. 4 is an elemental analysis chart of a part of the CNF shown in FIG. 3 in which a granular substance is encapsulated.

A cross-sectional photomicrograph of another carbon nanofiber obtained by the production method of the embodiment was shown in FIG. 3. As shown in the photomicrograph, a granular substance was encapsulated in the fiber. The encapsulated part was subjected to elemental analysis. The result was shown in FIG. 4. As shown in the chart of FIG. 4, it was found that the encapsulated part was Co in a metal state.

INDUSTRIAL APPLICABILITY

According to the present invention, the carbon nanofiber can be obtained in which at least one type of metal-based Co selected from metal cobalt, carbon-containing cobalt metals, and cobalt-carbon compounds is contained in the fiber in a wrapped state. Since the metal-based Co is contained in an enclosed state, the metal-based Co is stable and not likely to be detached or exfoliated. Accordingly if the carbon nanofiber is used as a conductive filler in a resin composition, or as a conductive assistant in a lithium secondary battery or the like, conductivity, chemical properties and the like are not affected by the metal-based Co. Therefore, the carbon nanofiber of the present invention can be suitably used as a conductive material or a functional material.

The invention claimed is:

1. A carbon nanofiber that is produced by a vapor phase reaction of a carbon oxide-containing raw material gas using a metal oxide powder containing a Co oxide as a catalyst, wherein at least one type which is selected from metal cobalt, carbon-containing cobalt metals, and cobalt-carbon compounds and which has a granular shape and a size to occupy 70% to 90% of the inner diameter of the carbon nanofiber is encapsulated in the carbon nanofiber in a wrapped state.

2. The carbon nanofiber according to claim 1, wherein at least one type which is selected from the metal cobalt, the carbon-containing cobalt metals, and the cobalt-carbon compounds and which has a granular shape is encapsulated at a tip end of the fiber.

* * * * *